US008826809B2

(12) United States Patent
Lee

(10) Patent No.: US 8,826,809 B2
(45) Date of Patent: Sep. 9, 2014

(54) COOKING APPLIANCE

(75) Inventor: Young Jun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 13/318,078

(22) PCT Filed: Sep. 9, 2009

(86) PCT No.: PCT/KR2009/005106
§ 371 (c)(1), (2), (4) Date: Jan. 18, 2012

(87) PCT Pub. No.: WO2010/128718
PCT Pub. Date: Nov. 11, 2010

(65) Prior Publication Data

US 2012/0118172 A1 May 17, 2012

(30) Foreign Application Priority Data

May 4, 2009 (KR) ........................ 10-2009-0039001

(51) Int. Cl.
*A47J 37/10* (2006.01)
*H05B 3/10* (2006.01)
*H05B 3/16* (2006.01)
*H05B 3/70* (2006.01)

(52) U.S. Cl.
CPC ........................................ *H05B 3/70* (2013.01)
USPC .............................. 99/422; 219/543; 219/552

(58) Field of Classification Search
USPC ........... 99/372, 377–379, 385, 424, 425, 441, 99/445, 464; 219/424, 450.1, 452.12, 219/465.1, 466.1, 468.1, 468.2, 524, 547; 338/226, 227, 230, 294, 552
See application file for complete search history.

(56) References Cited

U.S. PATENT DOCUMENTS

| | | | | |
|---|---|---|---|---|
| 3,231,718 | A * | 1/1966 | Vasile | 219/450.1 |
| 3,781,527 | A * | 12/1973 | Tymczak | 219/540 |
| 5,004,617 | A * | 4/1991 | Bowen et al. | 426/233 |
| 5,488,897 | A * | 2/1996 | Snyder | 99/445 |
| 6,147,334 | A * | 11/2000 | Hannigan | 219/544 |
| 8,180,269 | B2 * | 5/2012 | Beach et al. | 399/330 |
| 2004/0084439 | A1 * | 5/2004 | Galliou et al. | 219/465.1 |
| 2005/0247209 | A1 * | 11/2005 | Kuo et al. | 99/372 |
| 2008/0163763 | A1 * | 7/2008 | Hoyles et al. | 99/444 |

FOREIGN PATENT DOCUMENTS

| | | | |
|---|---|---|---|
| JP | 54-018746 | U | 2/1979 |
| JP | 57-204685 | U | 12/1982 |
| JP | 06-229566 | A | 8/1994 |
| KR | 20-0324131 | Y1 | 8/2003 |
| KR | 10-2005-0071414 | A | 7/2005 |

* cited by examiner

*Primary Examiner* — Dana Ross
*Assistant Examiner* — Alba Rosario-Aponte
(74) *Attorney, Agent, or Firm* — McKenna Long & Aldridge LLP

(57) ABSTRACT

A cooking appliance includes: an input part for inputting manipulations for cooking; a cooking grill formed with a controller for outputting a control signal according to the input from the input part and a grill section for contacting food; and a panel heater in the shape of a panel formed in the cooking grill to be controlled by the controller for supplying heat to the grill section, wherein the heat of the panel heater is transmitted concentratedly to the grill section of the cooking grill and the grill section is heated concentratedly so as to cook the food, thereby minimizing the loss of heat and making grill marks appear more clearly on the object.

6 Claims, 5 Drawing Sheets

COOKING APPLIANCE

This application is a National Stage Entry of International Application No. PCT/KR2009/005106, filed Sep. 9, 2009, and claims the benefit of Korean Application No. 10-2009-0039001, filed on May 4, 2009, each of which is incorporated herein by reference for all purposes.

TECHNICAL FIELD

The present invention relates to a cooking appliance, and more particularly, to a cooking appliance having a cooking grill for contacting food for cooking.

BACKGROUND ART

In general, a cooking appliance is a device for cooking or heating food using a heating source. The heating source includes an electric heater for generating heat upon application of electricity, a burner which generates heat using fossil fuel, and an induction heater which induces electricity to flow through a cooking container made of metal using an electromagnetic force.

In recent years, the cooling appliance includes a cooking grill having a grill shape and a grill heater for heating the cooking grill. Heat from the cooking grill is transferred to food being in contact with the cooking grill, thus leaving grill marks on the food.

However, the cooking appliance having a cooking grill has the problem of high heat loss and slow thermal response because the grill heater heats the entire cooking grill.

DISCLOSURE

Technical Problem

The present invention has been made in an effort to solve the problems occurring in the prior art, and it is an object of the present invention to provide a cooking appliance which transfers heat concentratedly on a grill section of the cooking grill.

Technical Solution

In order to solve the aforementioned problem, there is provided a cooking appliance according to the present invention, including: an input part for inputting manipulations for cooking; a cooking grill formed with a controller for outputting a control signal according to the input from the input part and a grill section for contacting food; and a panel heater in the shape of a panel formed in the cooking grill to be controlled by the controller for supplying heat to the grill section.

The panel heater is formed in the same pattern as the grill section.

The panel heater includes: a plurality of grill section heating parts facing the grill section; and a connecting portion connecting between the grill section heating parts.

The grill section heating parts are formed in the lengthwise direction of the grill section.

The panel heater is a resistance heating element which is applied and coagulated on the grill section.

The cooking grill includes a grill plate, which has the grill section protruding on one surface, and the panel heater is formed to correspond to the grill section on the opposite side of the surface where the grill section of the grill plate is formed.

The cooking grill includes a cover that covers the panel heater.

The cover covers the opposite side of the surface where the grill section of the grill plate is formed.

The cover is made of the same material as the grill plate or an insulating material.

The grill section includes a plurality of hollow cylinders, the inside of which is empty, and the panel heater is rounded in a circumferential direction along the inner surface of each of the hollow cylinders.

The panel heater is formed to be in surface contact with one side close to food, rather than to the other side distant from the food, with respect to the center of each of the hollow cylinders.

The center of curvature of the panel heater is consistent with the center of the hollow cylinder, and the panel heater is formed in the range of 180° along the inner surface of the hollow cylinder.

The grill section includes a plurality of hollow cylinders, the inside of which is empty, the cooking grill further includes a plurality of plate parts formed between a plurality of hollow semicylinders so as to join the plurality of hollow semicylinders together, and the panel heater is rounded in a circumferential direction along the inner surface of each of the hollow cylinders.

The cooking appliance according to the present invention includes: a cooking grill having a grill section for contacting food; and a panel heater having the shape of a panel, and supplying heat to the grill section.

Advantageous Effects

The thus-configured cooking appliance according to the present invention has the advantage of minimizing heat loss and making grill marks appear more clearly on because the grill section is concentratedly heated by the panel heater and the heat transmitted through the grill section penetrates into the food to cook the food.

BEST MODE

Hereinafter, an exemplary embodiment of the present invention will be described in detail with reference to the accompanying drawings.

Figure 1:
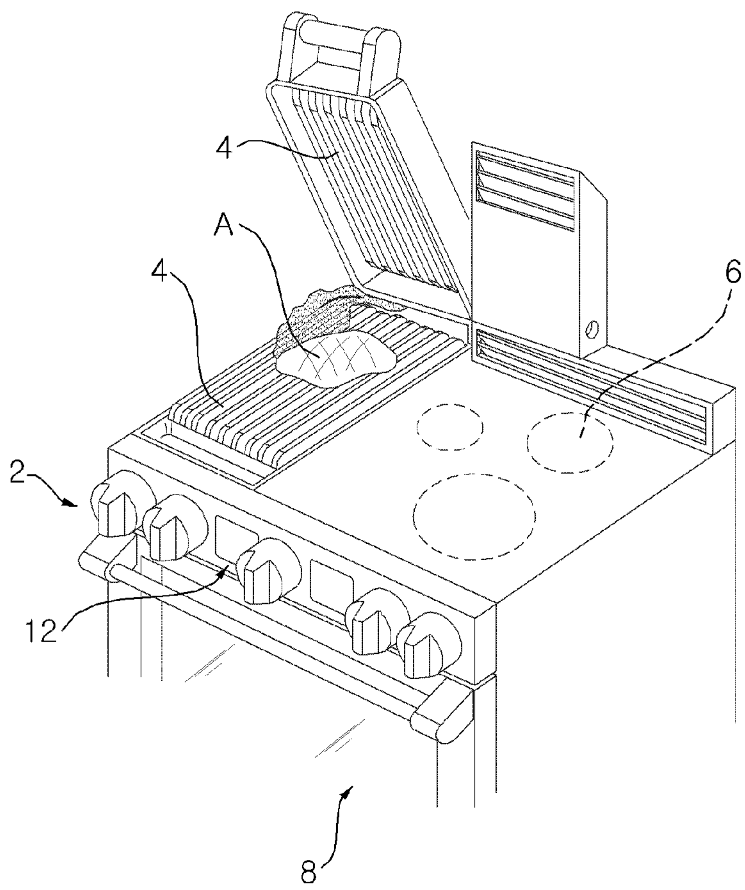
FIG. 1 is a perspective view of a cooking appliance according to an exemplary embodiment of the present invention.
Figure 2:
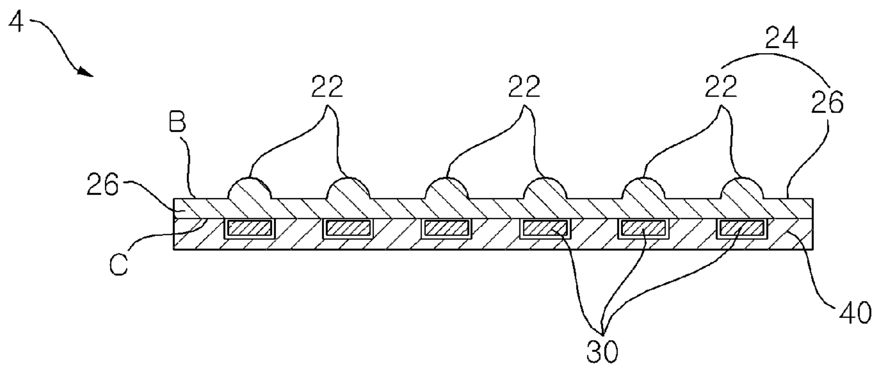
FIG. 2 is a transverse cross-sectional view of a griller shown in FIG. 1.
Figure 3:
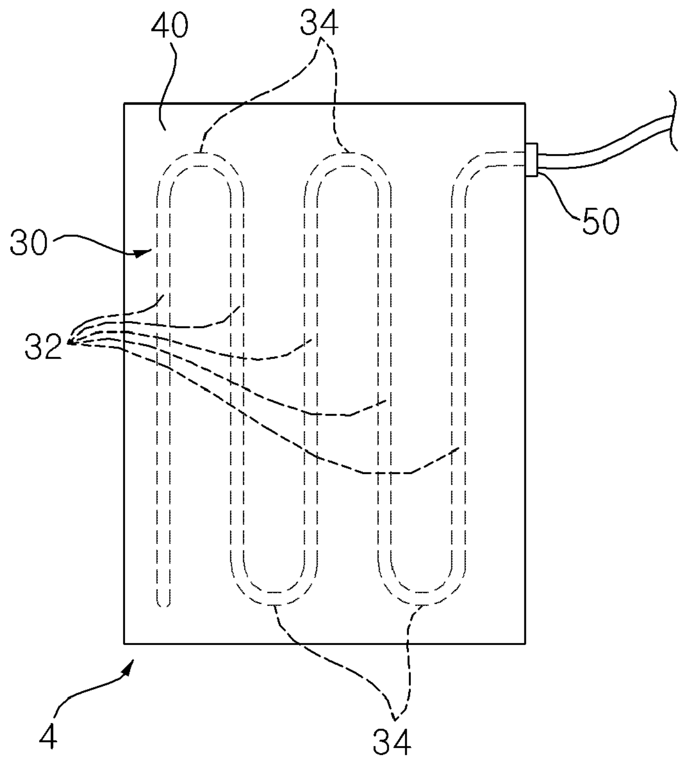
FIG. 3 is a bottom view of the griller shown in FIG. 1.

FIG. 1 is a perspective view of a cooking appliance according to an exemplary embodiment of the present invention, FIG. 2 is a transverse cross-sectional view of a griller shown in FIG. 1, FIG. 3 is a bottom view of the griller shown in FIG.

Figure 4:
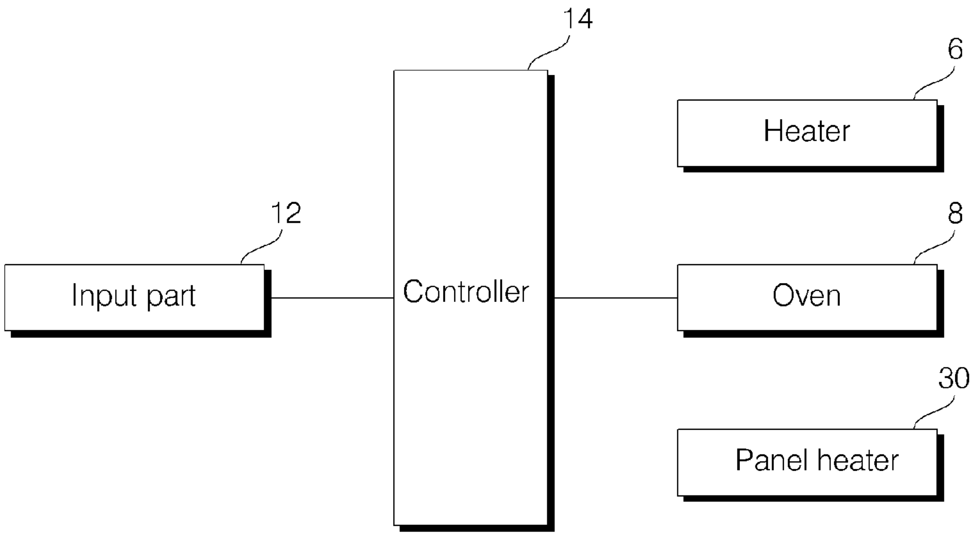
FIG. 4 is a control block diagram showing the cooking appliance according to an exemplary embodiment of the present invention.

1, and FIG. 4 is a control block diagram showing the cooking appliance according to an exemplary embodiment of the present invention.

As shown in FIG. 1, the cooking appliance according to the present exemplary embodiment includes a griller 4 installed on a main body 2, the griller 4 being installed on the main body 2 together with at least one of an induction heater 6, an oven 8, and a gas burner (not shown).

The cooking appliance further includes an input part 12 for inputting manipulations for cooking and a controller 14 for outputting a control signal according to the input from the input part 12.

The griller 4 comes into contact with food (A) to cook the food (A) and leaves grill marks on the food (A). The griller 4 is installed to be fixed in position to the main body 2 or installed to rotate around the main body 2 or slide.

The griller 4 includes a cooking grill 24 having a grill section 22 for contacting the food (A) and a panel heater 30 in the shape of a panel formed in the cooking grill 24 to be controlled by the controller 14 for supplying heat to the grill section 22.

The cooking grill 24 includes a grill plate 26 which is in the shape of a plate and has the grill section 22 protruding on one surface.

The panel heater 30 is formed in the same pattern as the grill section 2, and includes a plurality of grill section heating parts 32 facing the grill section 22 and a connecting part 34 connecting between the grill section heating parts. The grill section heating parts 32 are longitudinally formed like the grill section 22, in parallel with the lengthwise direction of the grill section 22, and have the same pattern as the grill section.

The panel heater 30 is a resistance heating element which is applied and coagulated on the grill section 22, and whose cross section is in the shape of a straight line.

The panel heater 30 is formed to correspond to the grill section 22 on the opposite side of the surface where the grill section 22 of the grill plate 26 is formed.

The cooking grill 24 includes a cover 40 that covers the panel heater 30.

The cover 40 covers the opposite side (C) of the surface (B) where the grill section 22 of the grill plate 26 is formed.

The cover 40 is made of a metal with high heat-transfer performance, and is made of the same material as the grill plate 26 or an insulating material.

A wire connector 50 is installed next to at least one of the grill plate 26 and cover 40 of the griller 4 to connect a wire in order to apply electric power to the panel heater 30. An end of the panel heater 30 is connected to the wire connector 50.

Hereinafter, an operation of the present invention will be described below.

First, when a user inputs a manipulation of the griller 4 through the input part 12, the controller 14 supplies electric power to the griller 4, in particular, the panel heater 30. The panel heater 30 generates heat by resistance when electric power is supplied, and the griller 4 is heated when the peripheral portion of the panel heater of the grill plate 26 receives the heat transferred from the panel heater 30.

In the griller 4, the grill section 22 faces the panel heater 30, in particular, the grill section heating parts 32 when the panel heater 30 is heated. Thus, the heat is transferred more concentratedly on the grill section 22, as compared to when the panel heater 30 heats the entire plate-like grill to a predetermined level, the heat-transfer performance through the grill section 22 is improved, and the cooking time is shortened.

Meanwhile, the food contacting the grill section 22 receive heat concentratedly through the grill section 22, and begins to be heated overall, starting from the part contacting the grill section 22, and clear grill marks appear on the food (A).

Figure 5:
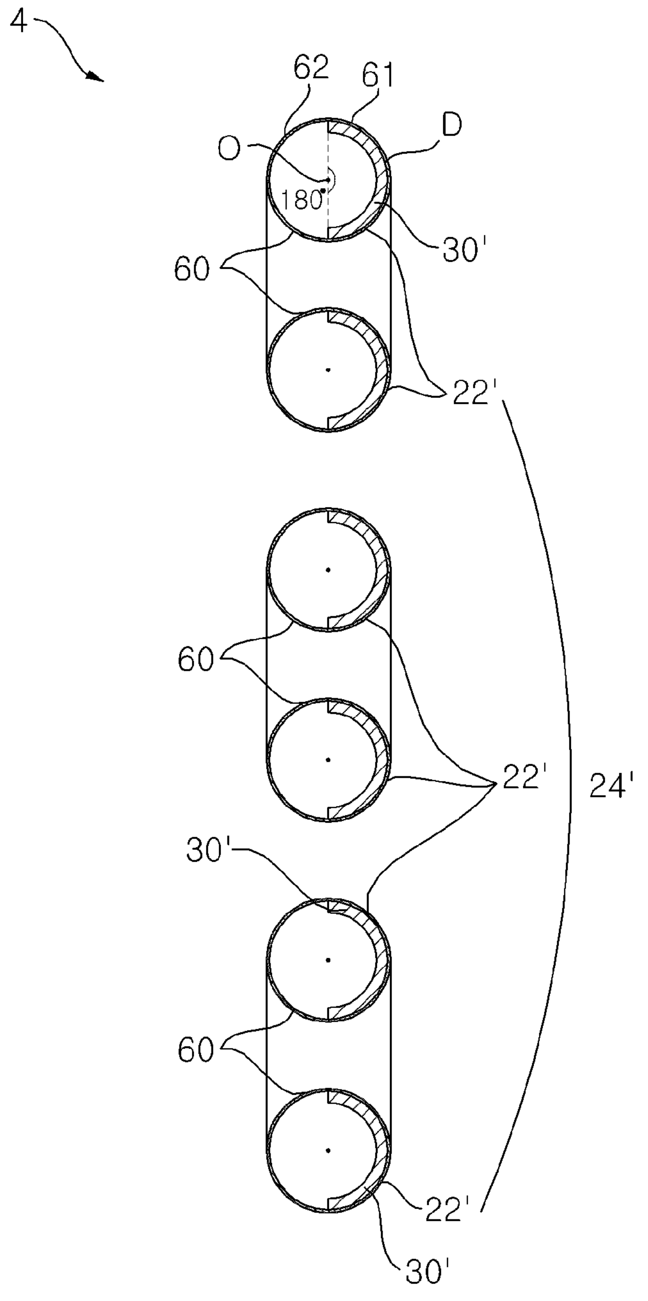
FIG. 5 is a transverse cross-sectional view enlargedly showing a cooking grill of a cooking appliance according to another exemplary embodiment of the present invention.

FIG. 5 is a transverse cross-sectional view showing a cooking grill of a cooking appliance according to another exemplary embodiment of the present invention.

In the cooking appliance according to the present exemplary embodiment, as shown in FIG. 5, the griller 4 includes a cooking grill 24' having a grill section 22' including a plurality of hollow cylinders 60, the inside of which is empty, and a panel heater 30' rounded in a circumferential direction along the inner surface (D) of each of the hollow cylinders 60.

The grill section 22' has a plurality of hollow cylinders 60 arranged side by side, and the plurality of hollow cylinders 60 are connected to be arranged in zigzag form or a hollow cylinder connecting drum connecting the plurality of hollow cylinders 60 is arranged to be orthogonal to the plurality of hollow cylinders 60.

The panel heater 30' is formed to be in surface contact with the one side 61 closed to food, rather than to the other side 62 distant from the food, with respect to the center (on the horizontal plane) of each of the hollow cylinders 60.

For example, when the griller 4 heats food placed on the top, the panel heater 30' is installed on the inner surface of the central upper side of the hollow cylinder 60. On the other hand, when the griller 4 heats the food placed on the bottom, the panel heater 30' is installed on the inner surface of the central lower side of the hollow cylinder 60.

A cross-section of the panel heater 30' is in the shape of a curve, and the center of curvature of the panel heater is consistent with the center (0) of the hollow cylinder 60. The panel heater 30' is formed in the range of 180° along the inner surface (D) of the hollow cylinder 60.

Other configurations and operations of the cooking appliance according to the present exemplary embodiment, except the cooking grill 24' and the panel heater 30', are identical or similar to those of the cooking appliance according to one exemplary embodiment of the present invention, and detailed descriptions thereof will be omitted.

In the cooking appliance according to the present exemplary embodiment, when electric power is supplied from the controller 14 to the panel heater 30', the panel heater 30' generates heat by resistance, and heats one side 61 close to food with respect to the center (on the horizontal plane) of the hollow cylinder 60. The heat is transferred to the food through the one side 61 close to the food along the shortest path compared to that of one exemplary embodiment of the present invention, and the heat-transfer performance is improved compared to one exemplary embodiment of the present invention.

Meanwhile, the panel heater 30' inside the hollow cylinder 60 is protected by the hollow cylinder 60. Thus, no insulating material or protective member for covering the panel heater 30' is needed, and food can be quickly cooked through a simple structure, leaving clear grill marks on the food.

Figure 6:
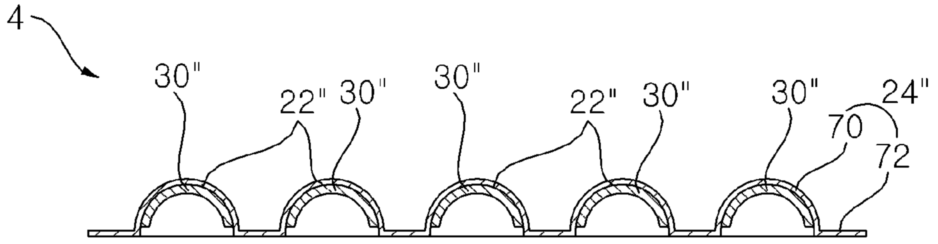
FIG. 6 is a transverse cross-sectional view enlargedly showing a cooking grill of a cooking appliance according to the other exemplary embodiment of the present invention.

FIG. 6 is a transverse cross-sectional view showing a cooking grill of a cooking appliance according to yet another exemplary embodiment of the present invention.

In the cooking appliance of the present exemplary embodiment, as shown in FIG. 6, the cooking grill 24" includes a grill section 22" including a plurality of hollow semicylinders 70, the inside of which is empty, and a plurality of plate parts 72 formed between a plurality of hollow semicylinders 70 so as to join the plurality of hollow semicylinders 70 together.

The panel heater 30" is rounded in a circumferential direction along the inner surface of each of the hollow cylinders 70.

Other configurations and operations of the cooking appliance according to the present exemplary embodiment, except the cooking grill 24" and the panel heater 30", are identical or similar to those of the cooking appliance according to one exemplary embodiment of the present invention, and detailed descriptions thereof will be omitted.

In the cooking appliance according to the present exemplary embodiment, when electric power is supplied from the controller 14 to the panel heater 30", the panel heater 30" generates heat by resistance, and heats the hollow semicylinders 70. The heat is transferred along the shortest path compared to that of one exemplary embodiment of the present invention, and the heat-transfer performance is improved compared to one exemplary embodiment of the present invention.

At this point, food scraps or oil generated from the food are dropped and left in the plate parts 72 if the cooking grill 24", and the plate parts 72 help collect and dispose of the food scraps or oil dropped through the grill section 22" of the cooking grill 24".

Meanwhile, the present invention is not limited to the above-described exemplary embodiments, and the griller 4 may include a cooking grill 24 having a grill section 22 for contacting food, a panel heater 30 having the shape of a panel formed in the cooking grill 24, and supplying heat to the grill section 22, and a cable (not shown) having a plug which is connected to the panel heater 30 to supply electric power to the panel heater 30, and is attachable to and detachable from a socket installed indoors or a condenser formed at other cooking appliances such as an induction heater 6, an oven 8, and a gas burner (not shown). Also, the griller 4 may be attached to and detached from other cooking appliances, such as an induction heater 6, an oven 8, and a gas burner (not shown), and various embodiments are possible within the technical scope of the present invention.

The invention claimed is:

1. A cooking appliance comprising:

an input part for inputting manipulations for cooking; a cooking grill formed with a controller for outputting a control signal according to the input from the input part and a grill section for contacting food; and a resistance panel heater in the shape of a panel formed in the cooking grill to be controlled by the controller for supplying heat to the grill section wherein the grill section comprises a plurality of hollow semicylinders, wherein the cooking grill comprises:

a plurality of plate parts formed between the plurality of hollow semicylinders so as to join the plurality of hollow semicylinders together, and the resistance panel heater is rounded in a circumferential direction along the inner surface of each of the hollow semicylinders.

2. The cooking appliance of claim 1, wherein the panel heater is formed in a same pattern as the grill section.

3. The cooking appliance of claim 2, wherein the panel heater comprises: a plurality of grill section heating parts facing the grill section; and a connecting portion connecting between the grill section heating parts.

4. The cooking appliance of claim 3, wherein the grill section heating parts are formed in the lengthwise direction of the grill section.

5. The cooking appliance of claim 1, wherein the resistance panel heater is a resistance heating element which is applied and coagulated on the grill section.

6. A cooking appliance comprising:

a cooking grill having a grill section for contacting food; and a resistance panel heater having the shape of a panel, and supplying heat to the grill section wherein the grill section comprises a plurality of hollow semicylinders, wherein the cooking grill further comprises:

a plurality of plate parts formed between the plurality of hollow semicylinders so as to join the plurality of hollow semicylinders together, and the resistance panel heater is rounded in a circumferential direction along the inner surface of each of the hollow semicylinders.

* * * * *